Sept. 14, 1965  TOHCHUNG WEI  3,205,886
PORTABLE HEATER FOR FOOD VESSELS

Filed Feb. 10, 1964  4 Sheets-Sheet 1

INVENTOR.
Tohchung Wei
BY Polachek & Saulsbury
ATTORNEYS.

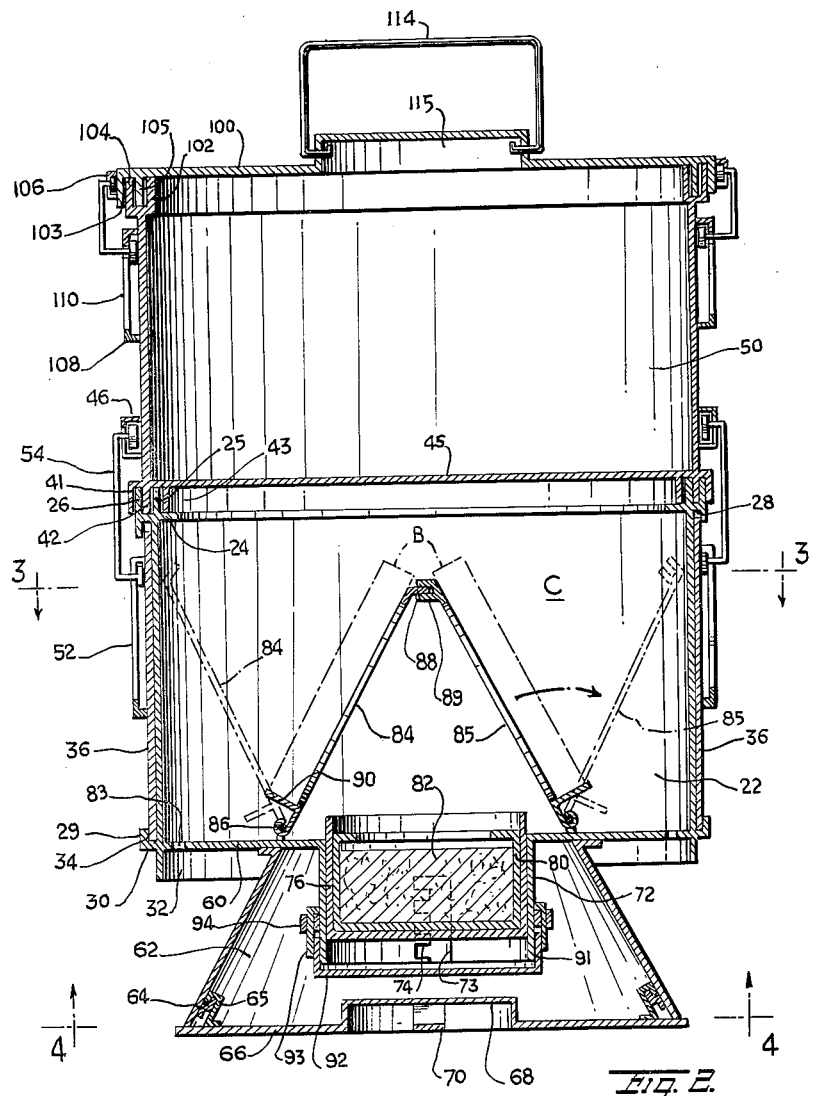
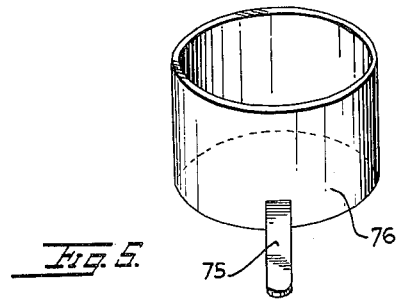

INVENTOR.
Tohchung Wei

Sept. 14, 1965 TOHCHUNG WEI 3,205,886
PORTABLE HEATER FOR FOOD VESSELS
Filed Feb. 10, 1964 4 Sheets-Sheet 4
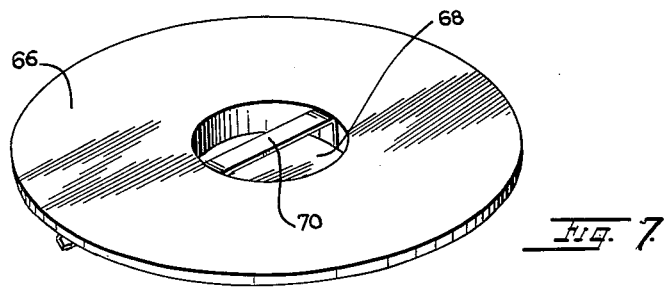
Fig. 7
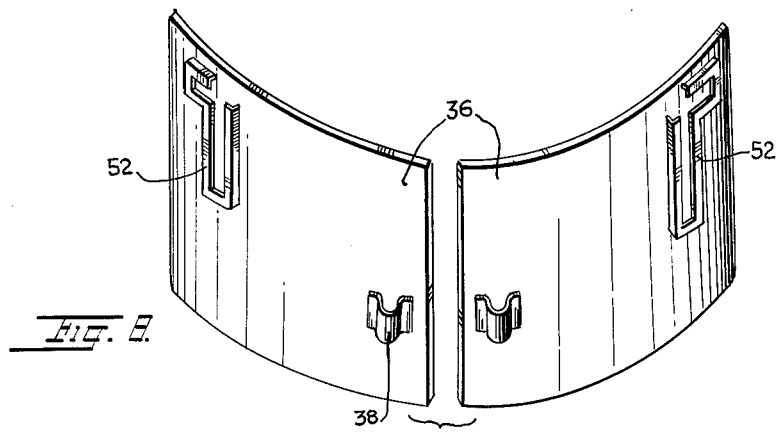
Fig. 8
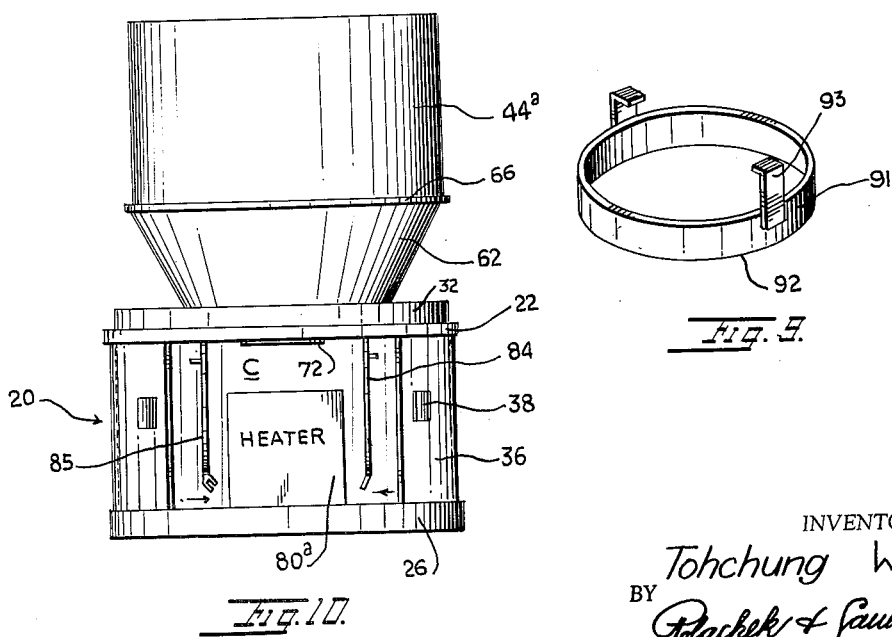
Fig. 9
Fig. 10
INVENTOR.
Tohchung Wei
BY Polachek & Saulsbury
ATTORNEYS.

United States Patent Office 3,205,886
Patented Sept. 14, 1965

3,205,886
PORTABLE HEATER FOR FOOD VESSELS
Tohchung Wei, 169 Broadway, New York, N.Y.
Filed Feb. 10, 1964, Ser. No. 343,548
12 Claims. (Cl. 126—261)

This invention concerns a portable stove especially intended for heating food vessels by means of canned fuel or other local heat source.

It is one object of the invention to provide a portable stove which can be used for supporting and heating a vessel at either end of the stove depending on the shape and size of the vessel.

Another object is to provide a portable stove of the character described adapted for using a canned fuel source and for supporting the same in selected elevated positions under the vessel to be heated.

A further object is to provide a portable stove as described with means for supporting slices of bread to be toasted inside the stove.

Still another object is to provide a portable stove with means for supporting a vessel in hermetically sealed relationship therewith to prevent loss of heat while heating the vessel.

A still further object is to provide a portable stove as described with attachment means for detachably coupling the stove to a vessel to be heated so that the attached vessel and stove can be transported together as a unit while the contents of the vessel are being heated, and subsequently the heated vessel can be detached from the stove.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 2 is a vertical sectional view taken on line 2—2 of FIG. 1.

FIG. 5 is a perspective view of a support for a fuel can employed in the stove.

FIG. 7 is a perspective view showing the other side of the bottom cover plate.

FIG. 8 is a perspective view of a pair of doors employed in the stove.

FIG. 9 is a perspective view of the burner cover cap.

FIG. 10 is a reduced side elevational view of the stove in an inverted position with another cooking vessel thereon.

Figure 1:
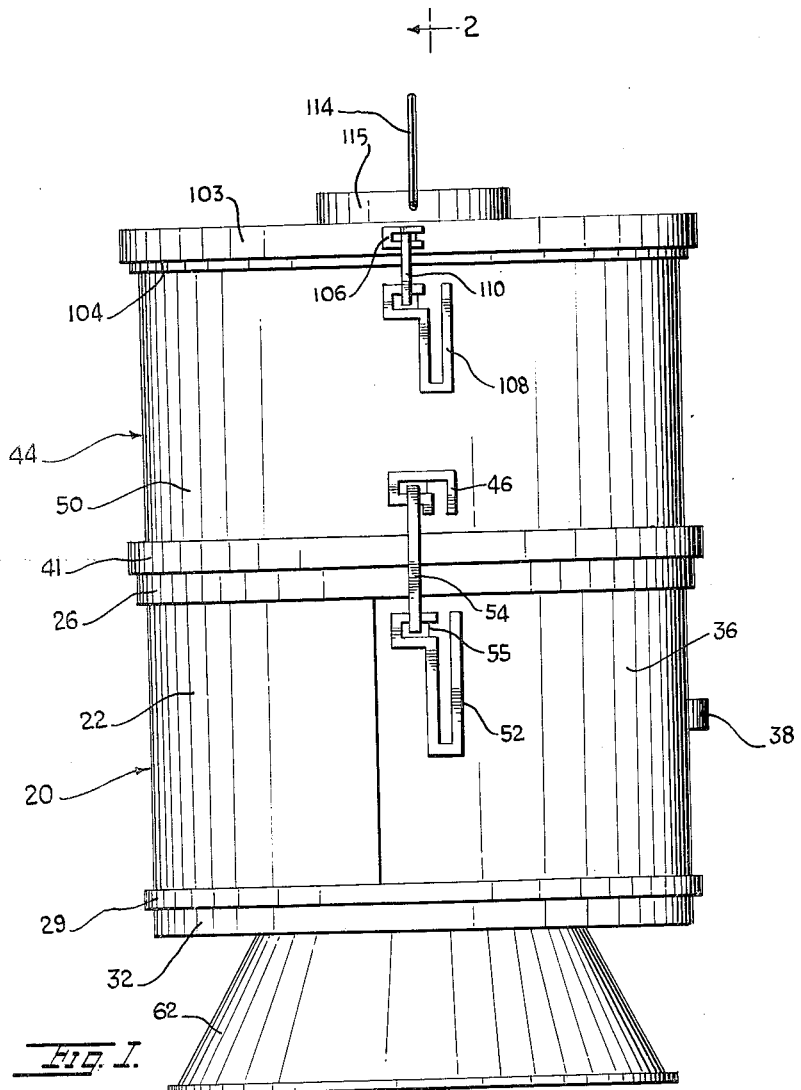
FIG. 1 is a side elevational view of a stove and food cooking vessel according to the invention.

Referring first to FIGS. 1–4 and 10, there is shown the portable stove 20. The stove has an axially vertical cylindrical wall 22 extending circumferentially about 220° to leave a wide front rectangular opening 23. Secured to the upper end of wall 22 is horizontal annular flange 24. This flange carries two axially vertical, radially spaced concentric cylindrical flanges 25, 26. Flange 26 extends below flange 24 outside of wall 22 to define a circular groove 28 with closed top and open bottom all around the stove. Another axially vertical flange 29 is supported by an annular narrow flange 30 all around the stove near the bottom end 32 of wall 22 to define a circular groove 34 opposing groove 28 all around the stove. The bottom end 32 of the wall 22 defines a cylindrical flange which is axially aligned with flange 25 at the top of the stove.

A pair of cylindrically curved doors 36 shown to best advantage in FIG. 8, are slidably engaged in the grooves 28 and 34. Handles 38 are located near adjacent edges of the doors to facilitate opening and closing them by sliding them circumferentially away from and toward each other in front of opening 23 of wall 22. The doors extend circumferentially about 100° each so that when fully open they expose an opening into the stove between their opposing edges of about 160°.

The upwardly extending flanges 25, 26 can receive in an interfitting sealing relationship, circumferentially extending, concentric, axially vertical, radially spaced flanges 41, 42 and 43 depending at the bottom of cylindrical cooking vessel 44. The vessel has a closed circular bottom 45 from which flanges 41, 42 and 43 depend.

In order to detachably couple the vessel and stove together in axial alignment there is provided a first pair of generally C-shaped flanged keepers 46 in diametrically opposite positions near the bottom end of cylindrical wall 50 of the vessel. Inverted L-shaped flanged keepers 52 are secured near upper ends of the doors 36, one keeper 52 being located on each door. When the doors are closed, keepers 52 are aligned with keepers 46 and movable coupling links 54 having rectangular flanged ends 55 can be engaged in the aligned keepers. When the vessel and stove are to be detached from each other, the links can be disengaged from keepers 46 and hung on keepers 52.

The stove has an annular flange 60 extending radially inward at its bottom end as shown in FIG. 2. A frustoconical base 62 is secured to flange 60 and flares outwardly and downwardly therefrom. On the inner side of base 62 near its bottom rim or edge are two brackets 64 in diametrically opposed positions.

Figure 6:
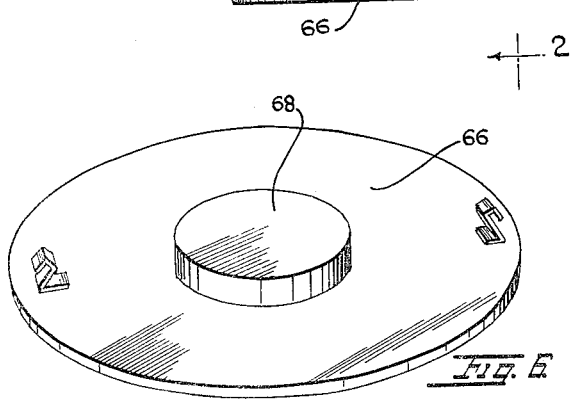
FIG. 6 is a perspective view showing one side of the bottom cover plate.
Figure 3:
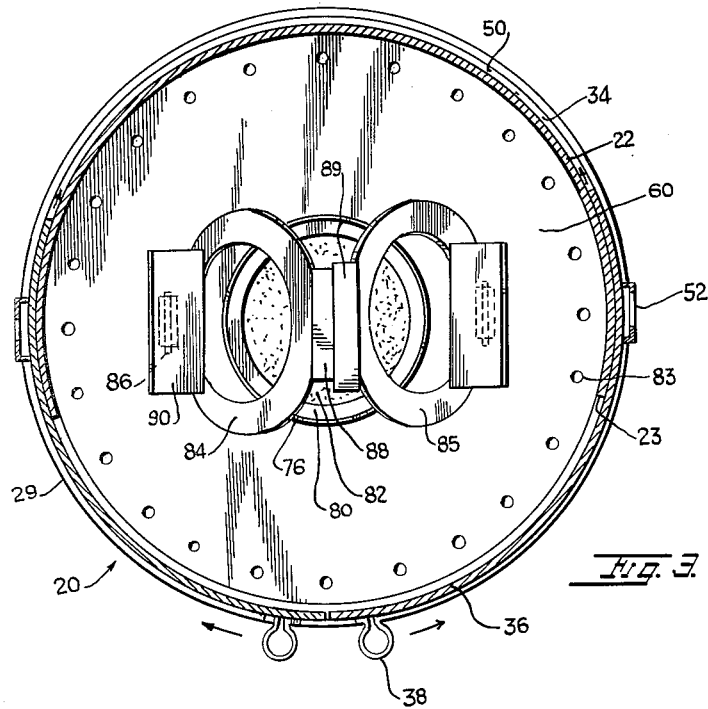
FIG. 3 is a horizontal sectional view taken on line 3—3 of FIG. 2.
Figure 4:
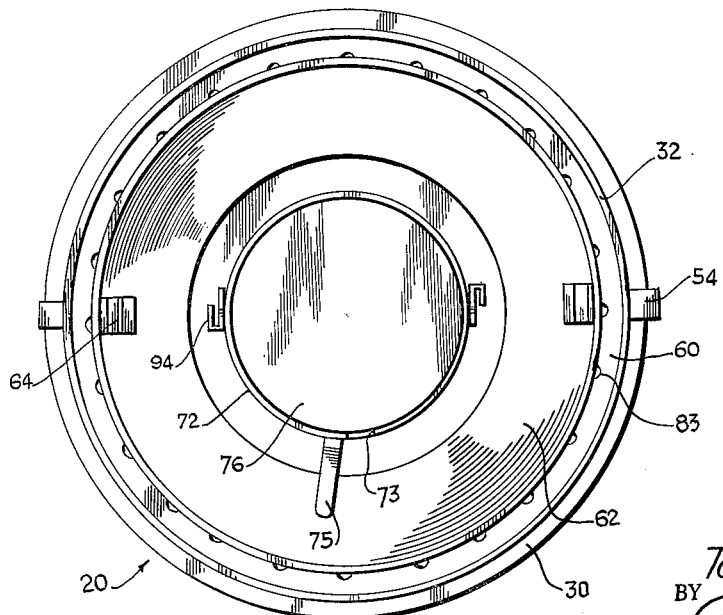
FIG. 4 is a bottom plan view taken on line 4—4 of FIG. 2, with bottom cover plate and burner cover cap removed.

Two hooks 65 secured to one side of a base or cover plate 66 can be slidably engaged on the brackets 64 by rotating the plate 66 on the base. The plate 66 has a recessed central portion 68 across which extends a handle 70 to facilitate rotating the plate; see FIGS. 6, 7. Handle 70 is flush with the outer surface of plate 66 so that the entire assembly can rest in a stable position on the plate 66.

A cylindrical sleeve 72 is secured at the inner periphery of flange 60. This sleeve extends below flange 60 axially of the stove into base 62. A slot 73 extends upwardly in the wall of sleeve 72. One edge of the slot is formed with circumferentially extending notches 74. The notches are spaced apart axially of the sleeve. In these notches can be engaged a handle 75 of a cup 76; see FIG. 5. The cup can be disposed in various positions of elevation in the sleeve by rotating the cup slightly to engage the handle 75 in one notch or another. In the open top of the cup fits a heater element in the form of a cylindrical can 80 containing an inflammable fuel 82. The can 80, cup 76 and sleeve 72 are all open to the compartment C in the stove defined by wall 22 and doors 36. A series of circumferentially spaced holes 83 are provided in flange 60 to admit air into the interior compartment C of the stove. By this arrangement the heater element 80 can be adjustably positioned with respect to vessel 44 which it heats.

Two generally circular flat rings 84, 85 are pivotally mounted on spaced, stationary pintles 86. Ring 84 has a lateraly bent outer flange 88 which fits into a grooved flange 89 formed on the upper end of ring 85. This engages the rings in a V-shaped array over the open sleeve 72 and heater element 80. Two other flanges 90 are formed at bottom portions of the inner rims of the rings. Flanges 90 extend laterally outward to define ledges upon which slices of bread B, indicated by dotted lines in FIG.

2, can be mounted for toasting by the heat arising from the ignited fuel in heater element 80. The rings 84, 85 can be disengaged and rotated outwardly away from each other to the dotted line positions shown in FIG. 2.

A cover 92 can be provided for the bottom of the sleeve. This cover has a cylindrical skirt 91 as shown in FIGS. 2 and 9 carrying fingers 93 which engage in brackets 94 secured to the outer wall of the sleeve 72. The cover 92 is rotated on the sleeve to engage and disengage the fingers 93 and brackets 94. This cover can be disengaged and mounted on the upper portion of sleeve 72 which projects upwardly compartment C for covering the heater element 80 when not in use.

In order to provide a closed transportable assembly, a circular cover 100 may be provided with concentric, cylindrical, depending flanges 105, 103 which interfit in sealing relationship with flanges 104, 102 formed at the upper end of the vessel. C-shaped flanged keepers 106 on the outer cover flange 103 can be coupled with inverted L-shaped flanged keepers 108 on vessel wall 50 by links 110 having rectangular flanges 112 at their ends engaged in the respective keepers. The links 110 can be disengaged from the keepers for detaching the cover from the vessel. The cover has a handle 114 which is attached to a head 115 projecting upwardly from the cover. The handle 114 is used for carrying the entire assembly of cover 100, vessel 44, stove 20 and base plate 66.

FIG. 10 shows the stove 20 disposed in a position inverted with respect to the upright position of FIGS. 1 and 2. Another cylindrical vessel 44a rests on base plate 66 which now serves as a top cover plate and also serves to distribute heat to the vessel 44a. Heat is supplied by either heater element 80 or another heating device 80a which can be an electric or gas heater or any other desired type of heater. Heating device 80a will be disposed in compartment C. The doors 36 are shown open in FIG. 10, but they can be closed. Air to support combustion will pass through holes 83 in flange 60. The rings 84 and 85 hang down vertically out of the way of the heating device 80a. The cap 92, cup 76 and heater element 80 are removed from sleeve 72 in this arrangement of the stove.

The stove 20 and the various vessels are all preferably made of thin sheet metal which is an economical material and results in an inexpensive, lightweight construction. The stove is, however, durable and very versatile in the many functions it can perform.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited.

2. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, said base member having bracket elements near its wider, outer end, and a base plate having members detachably engaged with said bracket elements for removably holding said base plate on said base member.

3. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, and a pair of rings pivotally mounted on said annular flange and disposable in inclined position over said sleeve in said compartment for supporting slices of bread for toasting by said heater element.

4. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, and a pair of rings pivotally mounted on said annular flange and disposable in inclined position over said sleeve in said compartment for supporting slices of bread for toasting by said heater element, said base member having bracket elements near its wider, outer end, and a base plate having members detachably engaged with said bracket elements for removably holding said base plate on said base member.

5. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, a cylindrical vessel having depending circumferentially spaced flanges at its bottom end interfitting in sealing relationship with the flanges at the upper end of said cylindrical wall for heating by said heater element, flanged keepers on said vessel and on said doors, and links detachably engaging the keepers so that the vessel is detachably secured to the stove, whereby the stove body and vessel are transportable together as a unit while said heater element heats the vessel.

6. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, a cylindrical vessel having depending circumferentially spaced flanges at its bottom end interfitting in sealing relationship with the flanges at the upper end of said cylindrical wall for heating by said heater element, flanged keepers on said vessel and on said doors, and links detachably engaging the keepers so that the vessel is detachably secured to the stove, whereby the stove body and vessel are transportable together as a unit while said heater element heats the vessel, said base member having bracket elements near its wider, outer end, and a base plate having members detachably engaged with said bracket elements for removably holding said base plate on said base member.

7. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, a cylindrical vessel having depending circumferentially spaced flanges at its bottom end interfitting in sealing relationship with the flanges at the upper end of said cylindrical wall for heating by said heater element, flanged keepers on said vessel and on said doors, and links detachably engaging the keepers so that the vessel is detachably secured to the stove, whereby the stove body and vessel are transportable together as a unit while said heater element heats the vessel, and a pair of rings pivotally mounted on said annular flange and disposable in inclined position over said sleeve in said compartment for supporting slices of bread for toasting by said heater element.

8. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof to support the stove body in axially vertical elevated position, a sleeve centrally secured to said annular flange at its inner rim, said sleeve having an axially extending slot with circumferentially extending axially spaced notches, and a cup holder for a heater element axially disposed in said sleeve and having a handle adjustably engageable with said notches for adjustably positioning said holder axially of said sleeve, said annular flange having holes therein to admit air into said compartment for supporting combustion when said heater element is ignited, a cylindrical vessel having depending circumferentially spaced flanges at its bottom end interfittitng in sealing relationship with the flanges at the upper end of said cylindrical wall for heating by said heater element, flanged keepers on said vessel and on said doors, and links detachably engaging the keepers so that the vessel is detachably secured to the stove, whereby the stove body and vessel are transportable together as a unit while said heater element heats the vessel, and a pair of rings pivotally mounted on said annular flange and disposable in inclined position over said sleeve in said compartment for supporting slices of bread for toasting by said heater element, said base member having bracket elements near its wider, outer end, and a base plate having members detachably engaged with said bracket elements for removably holding said base plate on said base member.

9. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof, to support the stove body in elevated position, a sleeve centrally secured to said annular flange at its inner rim, and means on said sleeve for adjustably supporting a cylindrical heater element in different positions axially of said sleeve.

10. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof, to support the stove body in elevated position, a sleeve centrally secured to said annular flange at its inner rim, and means on said sleeve for adjustably supporting a cylindrical heater element in different positions axially of said sleeve, said base member having bracket elements near its wider, outer end, and a base plate having members detachably engaged with said bracket elements for removably holding said base plate on said base member.

11. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof, to support the stove body in elevated position, a sleeve centrally secured to said annular flange at its inner rim, and means on said sleeve for adjustably supporting a cylindrical heater element in different positions axially of said sleeve, said base member having bracket elements near its wider, outer end, and a base plate having members detachably engaged with said bracket elements for removably holding said base plate on said base member, and a pair of rings pivotally mounted on said annular flange and disposable in inclined position over said sleeve in said compartment for supporting slices of bread for toasting by said heater element.

12. A portable stove assembly, comprising a stove body having a cylindrical wall extending circumferentially less than 360° to define a lateral opening therein, cylindrical flanges at opposite ends of said wall extending 360° to define opposing circular grooves, a pair of cylindrically curved plates each extending circumferentially less than 150° and defining doors slidably engaged in said grooves for closing said opening to define a closed compartment with said cylindrical wall in said stove body and for providing lateral access into said compartment when the doors are separated, an annular flange secured near one end of said cylindrical wall and extending radially inward thereof, a frusto-conical base member secured to said annular flange and extending axially outward thereof, to support the stove body in elevated position, a sleeve centrally secured to said annular flange at its inner rim, and means on said sleeve for adjustably supporting a cylindrical heater element in different positions axially of said sleeve, a cylindrical vessel having depending circumferentially spaced flanges at its bottom end interfitting in sealing relationship with the flanges at the upper end of said cylindrical wall for heating by said heater element, flanged keepers on said vessel and on said doors, and links detachably engaging the keepers so that the vessel is detachably secured to the stove, whereby the stove body and vessel are transportable together as a unit while said heater element heats the vessel.

References Cited by the Examiner

UNITED STATES PATENTS

| | | | |
|---|---|---|---|
| 659,562 | 10/00 | Welkee | 126—266 |
| 1,254,019 | 1/18 | Ball | 126—43 |
| 2,838,044 | 6/58 | Wei | 126—369.3 |

FOREIGN PATENTS

| | | |
|---|---|---|
| 92,939 | 2/22 | Switzerland. |

JAMES W. WESTHAVER, *Primary Examiner.*